Oct. 13, 1953   R. C. SPOONER   2,655,092
VEHICLE HEATER AND SYSTEM
Filed Feb. 15, 1951
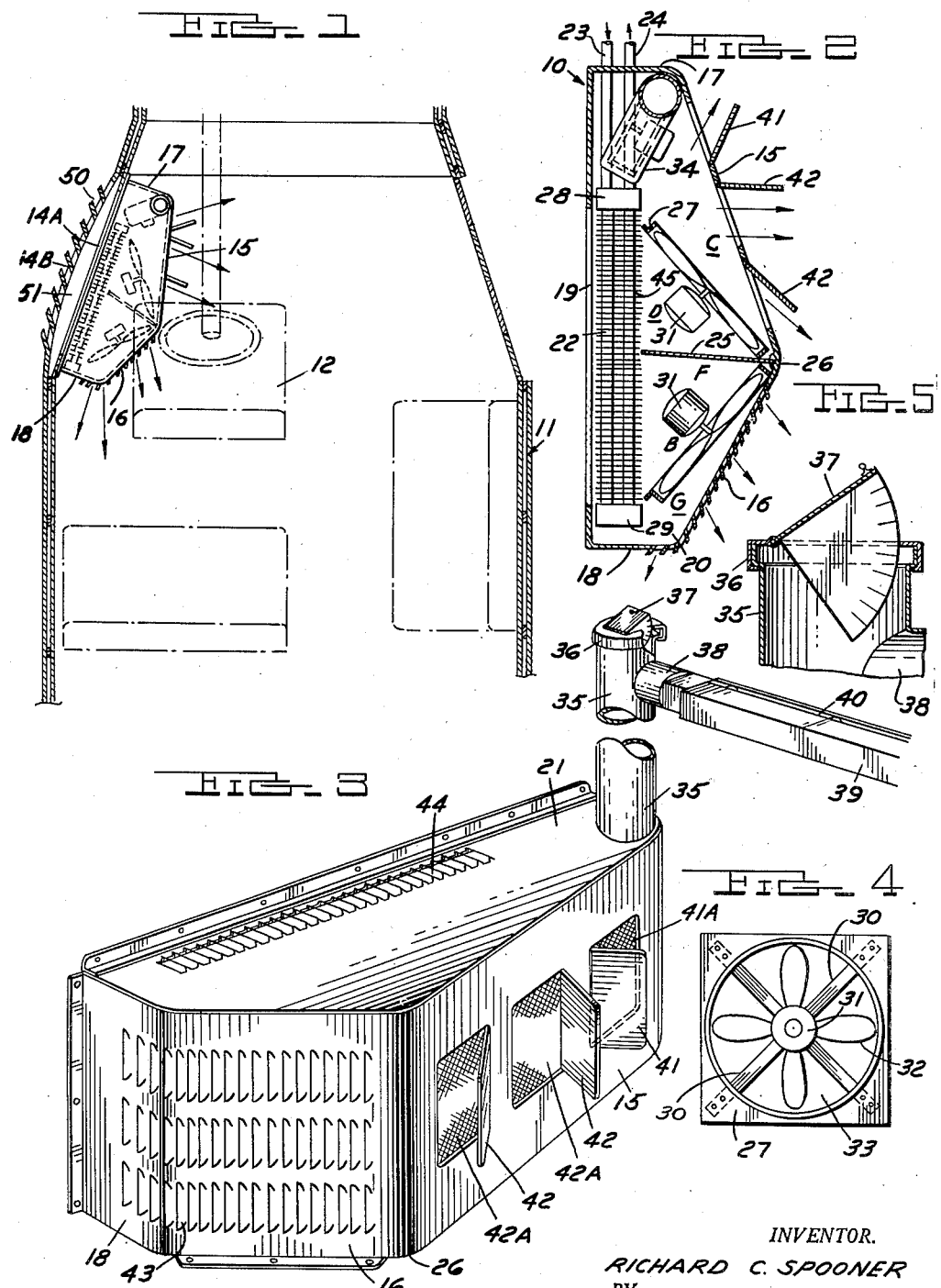
INVENTOR.
RICHARD C. SPOONER
BY
ATTORNEY Patented Oct. 13, 1953

2,655,092

UNITED STATES PATENT OFFICE 2,655,092

VEHICLE HEATER AND SYSTEM

Richard C. Spooner, Cleveland, Ohio, assignor to
A. R. Lintern Inc., a corporation of Michigan Application February 15, 1951, Serial No. 211,037

5 Claims. (Cl. 98—2)

This invention relates to vehicle space heaters and in particular to a primarily fresh-air heater capable of recirculating interior air and mixing the fresh and recirculated air and this application is a continuation in part of my co-pending application Serial Number 155,081.

The heater unit is particularly adaptable for use in conjunction with buses using a standard front-engine truck-chassis on which a bus body is mounted to the rear of the engine. In this type bus the body interfits with the chassis cowl and expands from the cowl to the full dimension of the body. The steering wheel and driver controls are immediately back of the cowl leaving a triangular space in the body to the left of the driver area. Such buses are employed by schools and are herein referred to as school buses for purposes of description and explanation.

In a school bus, the driver's seat and vehicle controls are located in the left front of the bus and an edit and exit door at the right front of the bus so that the driver can control the entry and leaving of passengers, collect fares, etc. The step well, fare box, and passenger aisle occupy the right front and center of the bus and the driver, driver's seat, and vehicle controls occupy the left front side of the bus so that the only available clear unused front floor area of this type bus is to the left of the driver adjacent the side wall, and, due to the body contour, this space is usually triangular.

To heat the front end of such a bus satisfactorily, all areas must be furnished with heated air including the step-well, aisle, driver, front passengers, and windshield for defrosting. Obviously, these demands upon a heater located to the left of the driver are divergent and even diametrically opposed in that the heat must be furnished fore, aft, up, and sideways. These demands are great considering the space limitation on the heating equipment and the available isolated space in which a floor heater may be placed.

It is, therefore, a primary object of the invention to provide a school bus fresh-air, recirculated-air heater which will fit in the confined space between the driver and the wall which is capable of furnishing heated air forwardly to the driver's feet and the fore part of the bus, sidewardly to heat the door and step-well area, rearwardly to heat the front passenger area, and upwardly to defrost the windshield.

An object of the invention is to provide a fresh air intake for the heating unit and a recirculated air intake for the unit which cooperate with each other to insure an adequate supply of heated air to the bus interior regardless of wind and other atmospheric conditions adversely affecting the supply of fresh air.

An object of the invention is to furnish a bus heater having a single heating core in conjunction with multiple fans angularly disposed thereto adapted to direct heated air in diverse directions.

An object of the invention is to provide a windshield defroster blower in conjunction with said fans and core to furnish heated air in a direction diverse to said fans to the windshield area of the bus to defrost same.

An object of the invention is to provide means for optionally dividing the heating area of the core between the fans.

An object of the invention is to provide means for directing all the heated air from one fan to the defroster blower, a mixture of heated and unheated air to the defroster blower, or unheated air only to the defroster blower.

An object of the invention is to provide means to furnish the entire heated air output of one fan to either the defroster blower, the driver's area, or the step-well and door area.

An object of the invention is to provide means for optionally powering the fans and defroster blower so that heated air can be circulated by one only or by any combination thereof and to provide vent doors in conjunction therewith to optionally direct heated air to the blower, driver area, front door area, any combination thereof or any one individually.

An object of the invention is to provide a heated air accumulation chamber housing the defroster blower so that a copious amount of heated air under pressure is optionally made available to the defroster to adequately supply the defroster system with a quantity of fresh air sufficient to accomplish defrosting under even the most adverse condition.

An object of the invention is to provide a hot water control valve adjacent the driver for regulating or stopping the flow of heating medium in the core.

An object of the invention is to provide a compact, economical, single core, multiple blower unit having all controls at the driver's finger tips and which is easily installable and accessible for servicing.

These and other objects of the invention will become apparent by reference to the following description of a bus heater embodying the invention taken in connection with the accompanying drawing, in which:

Fig. 1 is a plan view of the inventive heater

Fig. 2 is an enlarged plan view of the inventive heater.

Fig. 3 is a perspective view of the inventive heater including the inventive defroster system.

Fig. 4 is a plan view of a fan shroud and fan assembly; and

Fig. 5 is an enlarged cross-sectional view of the inventive rotatable spot-blast defroster head.

Referring now to the drawing wherein like numerals refer to like and corresponding parts throughout the several views, the fresh-air school bus-heater and defroster system disclosed therein to illustrate the invention comprises a substantially triangular heater shell 10 disposed in the left front of the bus body 11 in the area of the body 11 between the driver's seat 12 and the bus body inside wall 14 Fig. 1, which area is usually triangular as shown in more or less degree, and wherein it is to be noted that the angularly disposed front face 15 and the relatively shorter angularly disposed rear face 16 of the heater shell 10 facilitate directing air in the desired areas.

More particularly, the inventive heater comprises the shell 10, the angled faces 15 and 16, end portions 17 and 18, an open back 19, a bottom 20, a top 21, a single flat heater core 22 adjacent the back 19 spaced from the front end wall 17, hose connections 23 and 24 connecting the vehicle motor cooling system to the core 22, a divider 25 leading from the obtuse junction 26 of the angled faces 15 and 16 to the core 22 dividing the core area substantially equally, a front fan shroud 27 disposed between the junction 26 and the front end 28 of the core 22, a like rear fan shroud 27 disposed between the junction 26 and the rear end 29 of the core 22; the shrouds 27 being angularly disposed to both the adjacent faces 15 and 16, to the divider 25, and to the core 22; fan motor supports 30 mounted on the shrouds 27, fan motors 31 mounted on the supports 30, fans 32A and 32B mounted on the motors 30 adapted to rotate in the opening 33 of the shrouds 27, a defroster blower 34 disposed in the space between the end 28 of the core 22 and the front end 17 of the shell 10, a duct 35 rising from the blower 34 to a point adjacent the bottom of the bus side window and windshield, not shown, a manually rotatable head 36 on the duct 35, a hinged deflector door 37 on the top of the head 36, a side outlet coupling 38 in the duct 35, a defroster duct 39 leading from the duct 35 outlet coupling 38, a defroster air vent slot 40 in duct 39, a forwardly opening door 41 in the front 15, at least one rearwardly opening door 42 in the front 15, louvered vents 43 in the front 16 and end 18, and louvered recirculated air-intake vents 44 in the top 21 leading to the top of the core 22. Separate individually operated switches, not shown, are mounted on the shell 10 for controlling the electrical power circuits to the motors powering the fans 32A, 32B, and the blower 34 so that any one fan or blower individually or in any combination may be driven to furnish heated air as desired.

The body outside wall 14B is equipped with fresh-air scooping louvers 50 which take in fresh-air and deliver same to the space 51 between the bus body walls 14A and 14B which acts as a channel for the fresh air to the back of the heater shell 10 which is positioned over an aperture in the inside wall 14A. The fresh air enters the louvers 50, travels in the space 51 between the walls 14A and 14B to the aperture in the inside wall 14A, and thence through the aperture into the rear of the heater shell 10 and through the core 22 where it is heated and delivered to the interior of the bus.

The inside or bus interior air intake louvers 44 communicate with the relatively small top or edge of the core 22 whereas the outside of fresh air louvers 50 communicate with the relatively large full face area of the core 22. The louvers 44 and 50 are so related that when the outside louvers 50 are delivering a normal supply of fresh air, the fresh air at the face of the core 22 is under pressure and the fans 32A and 32B draw only fresh air. Conversely, when the outside louvers 50 are delivering less than a normal supply of fresh air, the fans 32A and 32B draw air via both the outside louvers 50 and the inside louvers 44. In this way, a full volume of heated air can always be delivered by the fan 32A and 32B. In the event no air is furnished by the outside louvers 50, the fans 32A and 32B can draw interior air via the louvers 44.

An optional air supply to the core 22 from the louvers 44 and 50 is automatic and entirely dependent on air conditions affecting the outside louvers 50 such as wind direction and velocity, snow, sleet, etc. An example, of one of the many possible air conditions affecting air delivery by the louvers 50 is a tail wind greater than the speed of the bus. Another condition is a right front wind so angling across the louvers 50 that a static boundary layer or low pressure area is developed in the area of the louvers 50. These conditions can affect the air delivery of the louvers 50 partially or completely and the amount of air then delivered by the inside louvers 44 will automatically counter the adverse affects. Normally, of course, the outside louvers 50 deliver air under pressure to the core 22 so that no air is passed through the inside louvers 44 to the core 22. In the event air is forced out of the louvers 44 into the interior of the bus, the area to the left of the driver is supplied with heated air.

The area of the heater 10 on the delivery side of the core 22 is divided into triangular chambers C, D, F, and G as defined by the face of the core 22, the fronts 15 and 16, the divider 25, and the fan shrouds 27 in conjunction with the fans 32A and 32B. Triangular chambers D and F behind the fans 32A and 32B permit the fans to pull air through the core 22 as channeled by the divider 25 so that air flows substantially uniformly through the core 22 substantially devoid of fan influences so that the core is uniformly utilized. The fans 32A and 32B deliver the air into the chambers C and D respectively where fan directional influence is substantially dissipated. The doors 41 and 42 liberate air from the chamber C and the louvers 43 liberate air from the chamber G which vents exercise a directional influence on the air passing therethrough to direct the air as desired in the bus interior. The chambers C, D, F, and G constitute plenums and effect an even air flow through the core 22 and permit desired direction of the air into the bus interior.

It has been found that the spacing of the fans from the core and from the triangulated faces of the heater is essential if the desired results are to be obtained, i. e. to be able to direct air to any portion of the front end of the bus at the option of the driver so that he can adjust the device to overcome the varying conditions encountered caused by varying wind direction, temperatures, speeds, and passengers.

When all the fan motors are running and all the heater vents are open, air through heater front 16 and end 18 is directed as described, and air through the front 15 is directed as described but the blower 34 draws air through the doorways 41A so that a mixture of heated and unheated air is fed to the defroster duct 35. If the door 41 is the only door closed, then the blower 34 is fed only heated air and this diminishes the supply of heated air to the doorway 42A. If all of the doors are closed, then all the heated air furnished by the fan 32A adjacent the front 15 is fed to the blower 34 under presssure.

In use, the doors 41 and 42 may be closed so that all the air directed to the space or chamber C can be placed under pressure therein to feed the defroster blower 34 an excess amount of heated air. If the fan 32A is off, and the door 41 or one of the doors 42 is open, the blower 34 will then furnish unheated air to the defroster system and if the doors 41 and 42 are closed then the blower 34 will drag air through the core 22 so that heated air is supplied to the defroster system. When the blower 34 is off, no air is supplied to the defroster system and all the air forced by the fan 32A will be dilevered through the doors 41 and 42.

Air delivered to the duct 35 by the blower 34 is normally delivered via the coupling 38 to the defroster duct 39 where it is directed via the vents 40 against the windshield to defog and defrost same. In the event the windshield or driver's side window becomes fogged or frosted in spite of a full volume of heated air being delivered by the fan 32A and the blower 34, the driver may open the door 37 in the rotatable head 36 on the duct 35 and so rotate the head and regulate the door 37 that he can direct a blast of air against any selected area of the windshield or side window to defrost that area quickly and efficiently so that complete, clear vision is at all times insured the driver. This is an important part of the invention as a terrific blast of heated air is needed to defrost areas quickly and the rotatable head 36 and adjustable door 37 constitute an universal joint enabling the driver to direct the air blast at any point or area as supplied by the fan 32A and the blower 34 with the doors 41 and 42 closed.

Wind direction and velocity, outside temperature, inside temperature, number of passengers using air, speed of the bus, etc. are factors which affect the proper heating of the bus and the frosting and fogging of the windshield and driver's side window which varying conditions pose a constant varying problem which cannot be successfully overcome unless the heating and defrosting equipment is versatile and adaptable to the changing conditions.

Due to the fact that the heating unit supplies a large amount of heated air to the bus interior the atmospheric pressure of the bus interior is raised over the outside so that flow of air in all body cracks and crevices is outwardly directed thereby eliminating inward cold air leaks and drafts. Due to the fact that used air is being constantly liberated and fresh air constantly supplied the exhaled moisture of the passengers is passed out of the bus interior reducing the moisture content of the interior air thereby reducing the tendency of the windows to frost and fog. The system is suitable for all-weather use in that the hot water control valve can be regulated to supply the desired amount of heating medium for cold or medium days and may be shut off on warm or hot days and unheated fresh air supplied, which is especially desirable on rainy days.

The instant invention provides a heater using a single core 22 which is capable of supplying sufficient heat to heat and defrost in conjunction with the fans 32A and B set at an angle to the core 22 and the deflecting fronts 15 and 16 and the end 18 set at still a different angle to the already angularly disposed fans and the disposition of the core, fans, and faces is considered critical to properly and satisfactorily distribute the heat to the desired areas of the bus front end and to the defroster system.

Although but a single embodiment of the invention has been shown and described in detail, it is obvious that many changes may be made in the size, shape, detail, and arrangements of the elements of the invention such as using doors in the rear face 16 instead of louvers within the scope of the appended claims.

I claim:

1. A bus space heater positionable between the driver area and the body side wall comprising a core, a core enclosing shell including a back, a front end, a rear end, a front face obtusely angling from said front end, a relatively shorter rear face obtusely angling from said rear end; said faces obtusely joining with each other, a bottom, and a recirculated air intake vented top communicating with the top of said core; said core being disposed adjacent said back spaced from said front end, a blower disposed between said front end and said core exhausting through said top, a duct rising from said blower adapted to extend to a point adjacent the bottom of a bus windshield and side windows, a vented defroster duct leading from said duct adapted to parallel a bus windshield bottom and adapted to direct air against a windshield to defrost same, a rotatable head on said duct, a door in said head; said door and head constituting a universal joint adapted to permit the driver to direct air on any particular area of the windshield or side window to spot-blast same, a front fan angularly disposed to said front face and to said core, a rear fan angularly disposed to said rear face and to said core, a divider positioned between said fans extending from the junction of said faces to said core separating said fans and dividing said core area between said fans, louvers in said rear face and said rear end for deflecting air to the right and left sides, rear, and center area of a bus, doors in said front face adapted to optionally direct air to the step-well and front door area, driver area, front passenger area of the bus, and to said defroster blower singly or in combination, and a main fresh air intake in said back communicating with the full area of said core.

2. A bus heater adapted to fit between the body side wall and the driver area comprising a triangularly faced core enclosing shell, a core adjacent the back of said shell and spaced from the front end thereof, a blower disposed in the space between said core and the front end of said shell, a duct rising from said blower adapted to extend to a point substantially even with the bottom of a bus windshield and side window, a rotatable head on said duct, a door on the top of said head adapted to be open an adjustable amount constituting with said head a universal joint for directing a spot-blast of air on a selected area of a bus windshield and/or side window to quickly defrost same, a divider in said shell extending from the apex of the triangular face to substantially the middle of said core, fans angularly disposed to said core, divider, and shell face, louvers in the rear portion of said face to direct air to selected areas of a bus, and doors in the front portion of said face for directing air to selected areas of said bus and to said blower, singly or in combination.

3. In a bus heater, a shell having an air inlet and a V-shaped face portion provided with air discharge openings, a core disposed within said shell and spaced from said face portion, a divider extending from the apex of said face to substantially the middle of said core dividing the core area so that substantially half said core is adapted to heat air flowing therethrough feeding on either side of said divider, and a fan disposed on either side of said divider at an angle to said core and to the adjacent portion of said V-shaped face to facilitate directing air in diverse directions.

4. A bus heater comprising a shell, a V-shaped face on said shell having a front portion and a rear portion, louvers in the rear portion of said face adapted to direct air toward the right side, center, and left side of a bus in the front passenger area thereof; doors in the front portion of said face adapted to direct air toward the front of a bus such as the driver's feet, aisle, step-well, and front door areas, a core in said heater adjacent the back of said shell, an air inlet in said shell communicating with said core, a divider extending from said core to the apex of said V-shaped face adapted to divide air coming through said core between the front and rear portions of said face, fans angularly disposed on either side of said divider between said core and said face in angular relation to said core and to said face portion adjacent thereto to facilitate directing air to the selected and desired areas of a bus via said louvers and doors.

5. A bus heater comprising a substantially V-shaped face having a forwardly facing portion and a rearwardly facing portion, a core spaced away from said face triangulating with said portions, an air inlet means communicating with said core, a divider extending from the apex of said face to the middle of said core dividing the apex angle of said face, fans angularly disposed on either side of said divider in angular relation to said core and the adjacent portions of said face creating a substantially triangular plenum chamber between said core and said fans, between said fans, said divider, and the adjacent portions of said face to reduce the directional influence of said fans on said core to permit even flow therethrough and to reduce the directional influence of said fans on directional vents disposed in said face so that air will be directed as desired via the directional vents in said face.

RICHARD C. SPOONER.

References Cited in the file of this patent
UNITED STATES PATENTS

| Number | Name | Date |
|---|---|---|
| 1,859,482 | Wines | May 24, 1932 |
| 1,988,745 | Nelson | Jan. 22, 1935 |
| 2,010,803 | Braine | Aug. 13, 1935 |
| 2,295,750 | Norris et al. | Sept. 15, 1942 |
| 2,330,653 | Wilson | Sept. 28, 1943 |
| 2,562,088 | Fisher et al. | July 24, 1951 |